US009443638B2

(12) United States Patent
Chow et al.

(10) Patent No.: US 9,443,638 B2
(45) Date of Patent: Sep. 13, 2016

(54) CARBON NANOTUBE (CNT) MATERIALS HAVING INCREASED THERMAL AND ELECTRICAL CONDUCTIVITY

(71) Applicant: Raytheon Company, Waltham, MA (US)

(72) Inventors: James R. Chow, San Gabriel, CA (US); Kurt S. Ketola, Los Angeles, CA (US); Carl W. Townsend, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 125 days.

(21) Appl. No.: 14/191,487

(22) Filed: Feb. 27, 2014

(65) Prior Publication Data

US 2014/0256840 A1  Sep. 11, 2014

Related U.S. Application Data (60) Provisional application No. 61/776,429, filed on Mar. 11, 2013.

(51) Int. Cl.
*H01B 1/12* (2006.01)
*B82Y 30/00* (2011.01)
*H01B 1/04* (2006.01)

(52) U.S. Cl.
CPC ............... *H01B 1/125* (2013.01); *H01B 1/04* (2013.01); *B82Y 30/00* (2013.01)

(58) Field of Classification Search
CPC .................. H01B 1/125; H01B 1/04
See application file for complete search history.

(56) References Cited

FOREIGN PATENT DOCUMENTS

| WO | WO 2008/048238 A2 | 4/2008 |
| WO | WO 2008/048238 A3 | 4/2008 |
| WO | WO 2011/135560 A1 | 11/2011 |
| WO | WO 2012/051597 A2 | 4/2012 |
| WO | WO 2012/051597 A3 | 4/2012 |
| WO | WO 2013/011516 A1 | 1/2013 |

OTHER PUBLICATIONS

Notification of Transmittal of the International Search Report and the Written Opinion of the International Searching Authority, or the Declaration, PCT/US2014/021767, Aug. 21, 2014, 1 page.
International Search Report, PCT/US2014/021767, Aug. 13, 2014, 4 pages.
Written Opinion of the International Searching Authority, PCT/US2014/021767, Aug. 13, 2014, 4 pages.
Zhao, et al., Iodine doped carbon nanotube cables exceeding specific electrical conductivity of metals, Scientific reports 1 (2011).
Lee, et al., Conductivity enhancement in single-walled carbon nanotube bundles doped with K and Br, Nature, 388, Jul. 17, 1997 pp. 255-256.

(Continued)

*Primary Examiner* — Sanza McClendon
(74) *Attorney, Agent, or Firm* — Daly, Crowley, Mofford & Durkee, LLP (57) ABSTRACT

A structure having a carbon nanotube material having a plurality of carbon nanotubes and an electrically or thermally conductive material disposed on at least a portion of the carbon nanotubes, such electrically or thermally conductive material being chemically bonded to such portion of the carbon nanotubes.

53 Claims, 4 Drawing Sheets

(56) References Cited

OTHER PUBLICATIONS

Herrmann et al., Multilayer and functional coatings on carbon nanotubes using atomic layer deposition, Applied Physics Letter, 87, 123110 (2005).
Ryu, et al., Dramatic electrical conductivity improvement of carbom nanotube networks by simultaneous de-bundling and hole-doping with chlorosulfonic, Chem., 2012, 22, 6959.
Behabtu, et al., Carbon nanotube-base neat fibers, NANOTODAY, vol. 3, Issues 5-6, Oct.-Dec. 2008, pp. 24-34.
Marcel Dekker, Inc, Handbook of Thermoplastics, p. 852.
Chiang, et al., Synthesis of covalently attached hexadecaaniles of carbon nanotubes towards electronic nanocarbon prepration, Nanoscale, Feb. 2010, 535-541.
Wylie, "Chemical Bonding of Carbon Nanotubes Aug. 20, 2004" Posted at https://www.google.com/?gws_rd=ssl#q=doug+wylie+chemical+bonding+of+carbon+nanotubes,date posted unknown.
Wylie, "Chemical Bonding of Carbon Nanotubes Aug. 20, 2004 "http://slideplayer.com/slide/5668341/" states" published by 'Madeline Freeman Modified 12 years ago'", post date unknown.
PCT International Preliminary Report on Patentability and Written Opinion of the ISA dated Sep. 24, 2014; For PCT Pat. App. No. PCT/US2014/021767; 6 pages.

FIG. 4  ENLARGED PORTION OF CNT MATERIAL

CARBON NANOTUBE (CNT) MATERIALS HAVING INCREASED THERMAL AND ELECTRICAL CONDUCTIVITY

CROSS REFERENCE TO RELATED APPLICATION

This application claims priority from U.S. Provisional application Ser. No. 61/776,429 entitled Carbon Nanotube (CNT) Materials Having Increased Thermal and Electrical Conductivity filed on Mar. 11, 2013 under 35 U.S.C. Section 119(e) which is incorporated herein by reference in its entirety for all purposes.

TECHNICAL FIELD

This disclosure relates generally to carbon nanotube (CNT) materials and more particularly to carbon nanotube materials having increased thermal and electrical conductivity.

BACKGROUND AND SUMMARY

Figure 1:
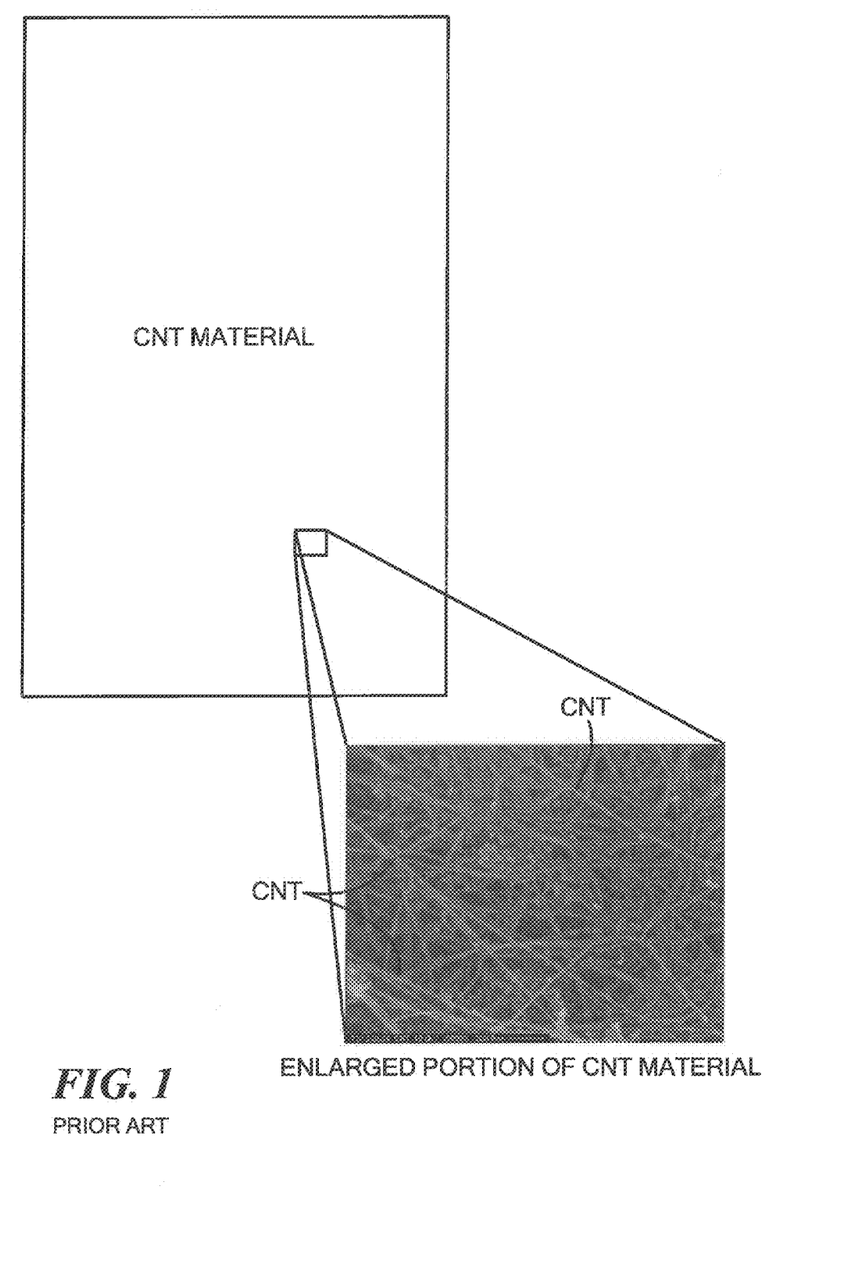
FIG. 1 is a simplified plan view of a sheet of CNT material according to the PRIOR ART with an magnified portion of the material (50,000 times magnification) showing a plurality of carbon nanotubes comprising the material.

As is known in the art, carbon nanotubes (CNT) materials are light weight electrical and thermal conductors. Commercially available CNT materials, such as for example shown in FIG. 1, comprise a plurality of carbon nanotubes (CNTs) bonded together in the form of sheet, tape, and yarns could be utilized in more electrical applications if its conductivity was more like copper (5.9E+7 S/m). Higher electrical conductivity CNT materials would enable lightweight, flexible circuit structures, key to a variety of buoyant and space radar platforms where meeting weight restrictions are critical. Higher thermal conductivity CNT materials would enable lightweight, flexible heat dissipating structures. Presently, CNT materials have electrical conductivity 1/10 of copper at high frequencies and 1/25 the conductivity at or near DC.

As is also known in the art, attempts have been made to increase electrical conductivity which can be characterized as mechanically and dopant based. Efforts are being made to increase the length of the CNTs, align the CNTs more parallel and end-to-end, and to densify the sheet and yarn type structure of carbon nanotubes materials by multi-layer compression. Researchers have also been investigating prudent doping of the materials. The addition of selected dopants has shown significantly higher conductivity. Most examples of doping that have shown significant improvement rely on the introduction of large atoms where a more diffuse and extended electron orbitals can promote electron connective paths between CNTs as well as form intermediate states in the semi-conductor CNT bandgaps increasing electronic conductivity. In most cases, the atoms are diffused into place. In a few situations, expensive transition metal doping (i.e. Pt, Pd) has been used. Such atoms have shown coordination affinity to the CNTs. The inventors have recognized that since the dopants are not chemically bonded in place, the aforementioned Van der Waal affinity makes than subject to property instability upon applied stress. Due to the relatively weak forces involved in Van der Waal bonding, distortion of individual CNTs and relative motion of adjacent CNTs can cause the dopant atoms to become dislodged from their original locations leading to change in properties.

In accordance with the present disclosure, a structure is provided comprising: a carbon nanotube material comprising a plurality of carbon nanotubes; and an electrically or thermally conductive material disposed on at least a portion of the carbon nanotubes, such material being chemically bonded to such portion of the carbon nanotubes.

In one embodiment, the electrically or thermally conductive material is covalently (i.e., chemically) bonded to such portion of the carbon nanotubes.

In one embodiment, molecules of the electrically or thermally conductive material are bonded to a plurality of the portion of the carbon nanotubes, In one embodiment, the electrically or thermally conductive material is a conductive polymer forming conjugated electron bridges between a plurality of the carbon nanotubes.

In one embodiment, a source of the electrically or thermally conductive material comprises polyacetylene.

In one embodiment, a source of the electrically or thermally conductive material comprises polyphenylacetylene.

In one embodiment the polymer is doped.

In one embodiment, the dopant is iodine or bromine.

In one embodiment, a method is provided comprising: providing a carbon nanotube material comprising a plurality of carbon nanotubes; providing a source of conductive monomer; transporting the monomer in gas form to the carbon nanotube material; converting the monomer to a conductive polymer; and chemically bonding the conductive polymer to the plurality of carbon nanotubes.

In one embodiment, the monomer is acetylene.
In one embodiment, the monomer is gaseous.
In one embodiment, the monomer is blended with gas.
In one embodiment, the gas is nitrogen or helium.
In one embodiment, the monomer is phenylacetylene.
In one embodiment, the transporting comprises passing a gas through a liquid monomer.
In one embodiment, the gas is nitrogen.
In one embodiment, the transporting comprises vaporizing the monomer.
In one embodiment, the vapor comprises bubbling the gas through the liquid monomer.
In one embodiment, the chemical bonding comprises using disassociation by thermal or photon mediated means.
In one embodiment, the photolysis comprises using UV photons.
In one embodiment, the photolysis comprises using a xenon arc lamp.
In one embodiment the carbon nanotube material is heated by passing current through it, thereby accomplishing thermal disassociation of monomer units.
In one embodiment, the monomer is transported to the carbon nanotube material in gas phase by flow either around or through CNT material.
In one embodiment, a polymerization process is used to chemically bond the conductive polymer onto the carbon nanotubes comprising: using ultraviolet (UV) photon energy optimized for particular molecular species in combination with an elevated temperature CNT material.
In one embodiment, the elevated temperature is used only on the nanotubes.
In one embodiment, phased intermittent flow of monomer, UV energy, and thermal energy are used for optimal placement of conductive bridges between pairs of CNT materials.
In one embodiment, the polymer is grown on selected regions of the nanotubes.
In one embodiment, the polymer is grown on junctions between pairs of the carbon nanotubes.
In one embodiment, the polymer is grown on resistive sites between the carbon nanotubes.

With such structure and method, the inventors have recognized that although electron travel within a CNT has little resistance, the finite length of each CNT results in a structure in which electrons have to move from CNT to CNT at the various crossing points (junctions) between the CNTs in order to get across the bulk material and that these junctions contribute a significant amount to the overall resistance of the CNT. More stable and higher electrical conductivity can be obtained by chemically modifying the CNT material so that gaps between the CNTs are bridged by conjugated pi-bond molecular chains that are bonded to or overlap the CNT ends or the CNT walls. With sufficient production of CNT to CNT bridges, electron travel will be facilitated thus reducing the inherent resistance and increasing the conductivity to be more metal-like. It should be noted that due to the fact that a portion of thermal conductivity of a material is mediated by electron transport, any improvements to the electrical conductivity will simultaneously result in an improvement in thermal conductivity as well. Commercially available CNT material has been exposed to non-optimized prescribed set of energetic and chemical conditions which resulted in an increase of electrical conductivity of 20%. This electro-physical effect will provide a tool for continued improvement of the CNT material to be metal-like.

Further, 1) The electrical conductivity increase of the formed CNT material can be obtained by photo-thermal energetic exposure of unsaturated, conjugated molecules in a flow reactor, 2) Conjugated pi-bond chains can be formed between CNTs to promote defined conductive paths for electron travel; 3) Defined electron paths between CNTs are chemically bonded in place which simultaneously makes-them resistant to flex, diffusion or distortion; 4) Conjugated electron bridges connect CNTs in the horizontal and vertical plane; 5) The resultant material is single phase and not prone to corrosion processes by removing galvanic dissimilar materials; 6) Post-process is amenable to high volume manufacturing; and 7) Uses an inexpensive feedstock.

Still further, the method and structure: Provides more defined conductive electron paths throughout the CNT material for enhanced electron mobility and increased electrical conductivity between tubes; Conductive paths are chemically bonded in place and not prone to local stresses as observed in doping; Provides natural layer to layer randomization so that skin effect is mitigated at higher frequencies; Also, chemically bonded conjugated electron bridges between tubes and at tube crossing points facilitates electron mobility through CNT bulk material.

Still further, the process: Uses conjugated hydrocarbon in a photo-thermal energetic exposure; Forming defined electrical bridges between discrete CNTs; Stable single phase material structure; Process amenable to high volume manufacturing; Reduces skin effect at high frequencies (>THz).

Yet still further, the Polymerization Process:
Uses solid or liquid monomer applied via solution exposure which subsequently become conductive with subsequent application of energy for chemical reaction;
Uses photon energy bands such as ultra-violet selected for particular molecular species in combination with elevated temperature CNT material;
Uses elevated temperature CNT material only;
Uses intermittent material flow optimally phased with applied energy for optimal placement of conductive bridges;
Makes use of flow of monomer through the thickness of the CNT material and energy application for more effective placement of conductive bridges through sheet thickness.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 2:
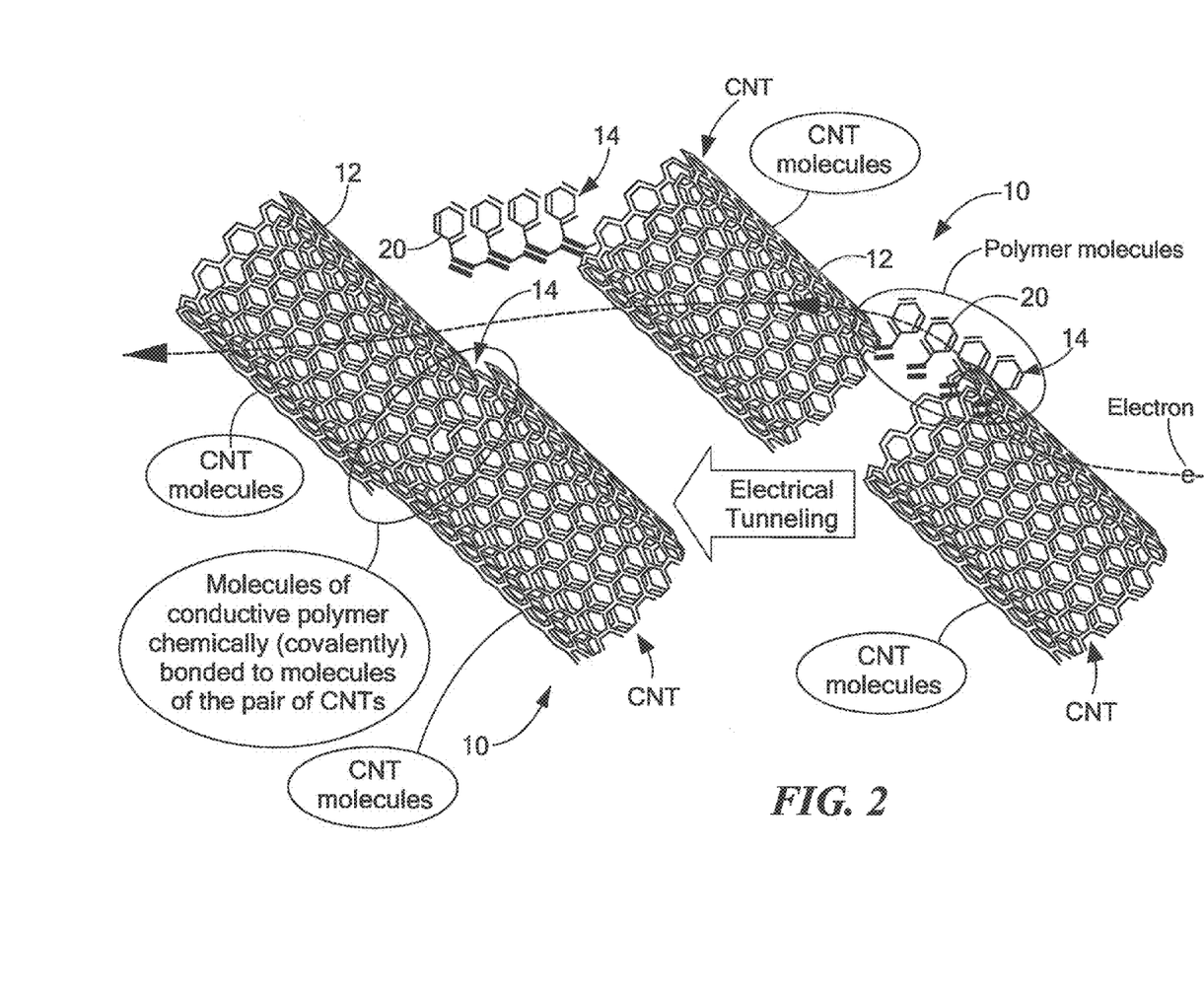
FIG. 2 is a schematic diagram illustrating chemical bounding of a conductive polymer to a plurality of carbon nanotubes of a carbon nanotube material according to the disclosure.

Referring now to FIG. 2, a plurality of carbon nanotubes 12 of a carbon nanotube to material is shown along with an electrically or thermally conductive material 14 disposed on at least a portion of the carbon nanotubes 12, such electrically or thermally conductive material 14 being chemically bonded to such portion of the carbon nanotubes 12. The electrically or thermally conductive material 14 is here covalently bonded to such portion of the carbon nanotubes 12. Molecules 20 of the electrically or thermally conductive material 14 is here a conductive polymer with molecules 20 of the electrically or thermally conductive material 14 covalently bond to, and between, portions of the carbon nanotubes 12. Here, for example, the electrically or thermally conductive material 14 comprises polyphenylacetylene. The polymer 14 may be doped with for example, iodine or bromine. More particularly, the conductivity of the freshly-formed conjugated conducting polymer may be enhanced by further doping using electron donating or electron withdrawing species which further reduce the conduction bandgap along the conjugated polymer chains. Electron donating species such as iodine or bromine may conveniently be used to enhance the conductivity in this manner. The dopants have the further advantage of enhancing the conduction of the individual semiconducting strands of nanotubes, thus enhancing the conduction of the CNT material as a whole Here, the polymer 14 may be disposed between ends of pairs of the carbon nanotubes to connect the pair of carbon nanotubes 12. More particularly, the electrically or thermally conductive material 14 is a conductive polymer forming conjugated electron bridges between the carbon nanotubes 12.

Figure 3:
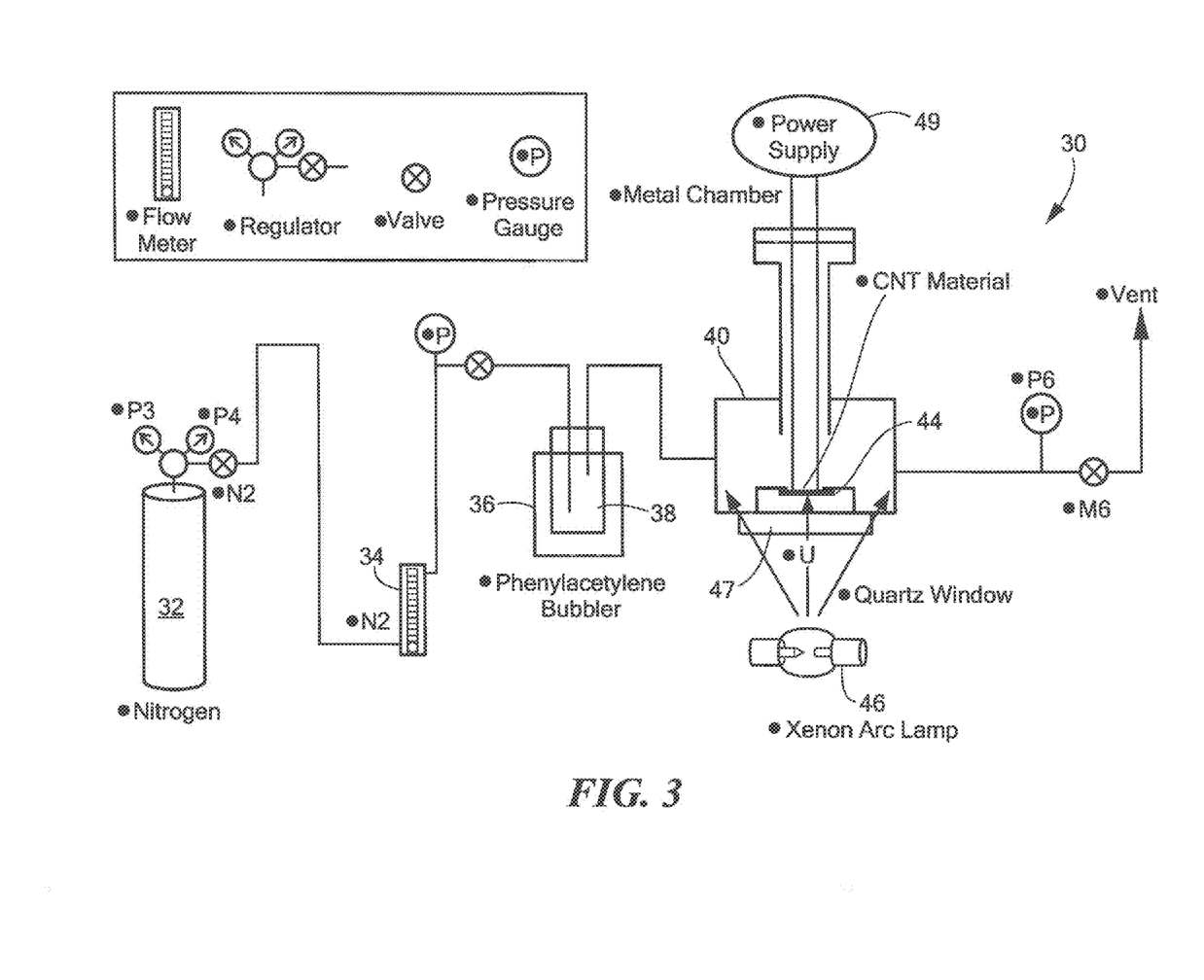
FIG. 3 is a schematic diagram of apparatus used to chemically bond a conductive polymer to carbon nanotubes of a carbon nanotube material according to the disclosure.
Figure 4:
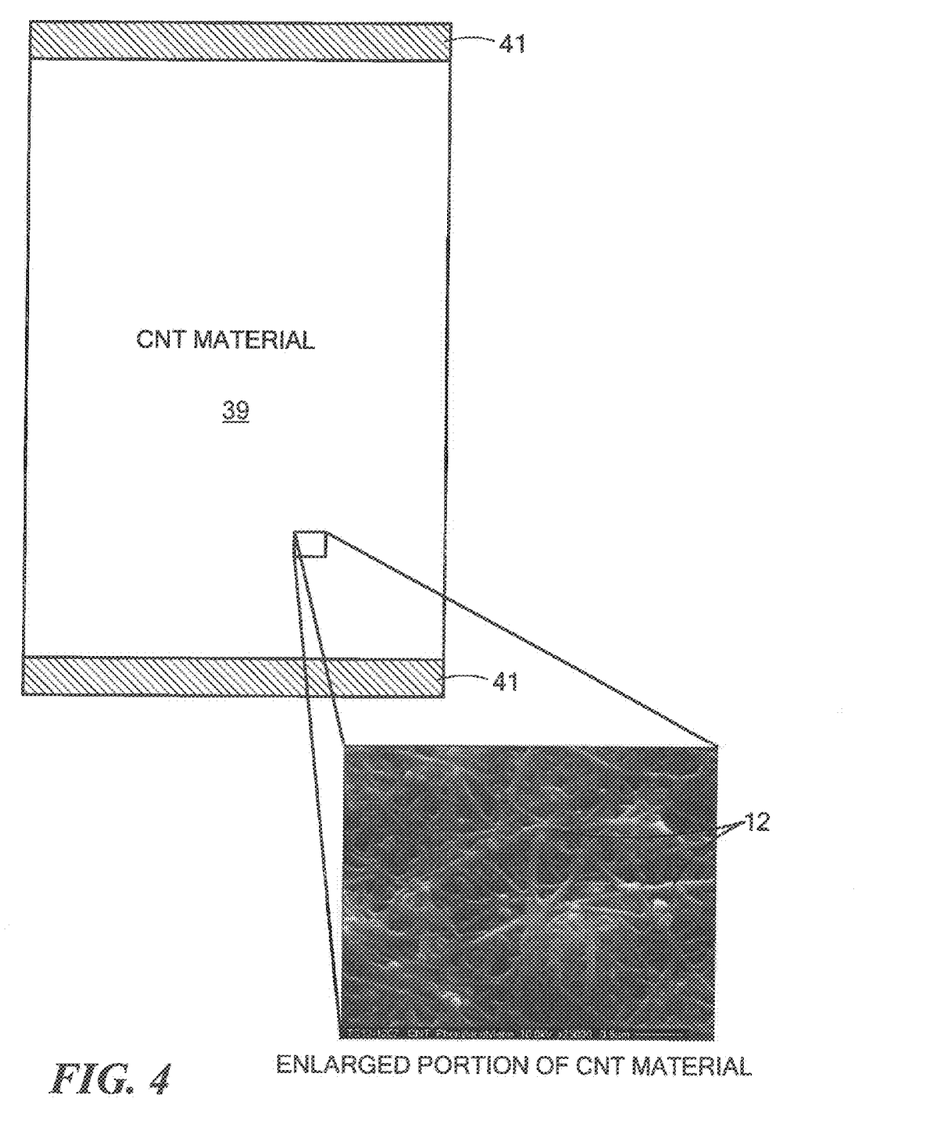
FIG. 4 is a simplified plan view of a sheet of CNT material according to the disclosure, with magnified portion of the material (25,000 times magnification, such sheet having electrodes on the opposing ends thereof for processing in the apparatus of FIG. 3.

Referring now to FIG. 3, apparatus 30 is shown for chemically bonding the conductive polymer 14 to carbon nanotubes 12 of a carbon nanotube material. The apparatus 30 includes a source 32 of nitrogen gas. The nitrogen gas is transported through a flow meter 34 to a bubbler 36 having a monomer 38, here for example liquid phenylacetylene. The nitrogen gas passing through the monomer 38 in the bubbler 36 vaporizes the liquid phenylacetylene monomer 38. The vaporized phenylacetylene monomer 38 is fed to a metal chamber 40. In a variant of this apparatus 30, the source of nitrogen 32 may be blended with acetylene gas, or may be replaced by helium. In this instance, the phenylacetylene 38 and phenylacetylene bubbler 36 are not needed. The CNT material 39, here a sheet having the carbon nanotubes 12 is shown in FIG. 4 has electrically conductive electrodes 41, here electroplated copper electrodes, on opposing ends thereof for processing in the apparatus of FIG. 3. More particularly, the carbon nanotube sheet 39 is disposed on a platform 44 in the chamber 40. A power supply 49 has its electrical potential connected to the electrodes 41 of the CNT material 39 such that an electrical current from the power supply 49 is passed through the CNTs 12 of material 39 to provide ohmic heating to the CNT material 39 and more particularly through the carbon nanotubes 12 thereof in an atmosphere of the vaporized phenylacetylene monomer 38. A source 46 of ultraviolet (UV) light is directed into the chamber 40, through a quartz window 47 along with the vaporized phenylacetylene monomer 38 and with the current from the power supply 44. As a result, through thermal and chemical photolysis, the phenylacetylene monomer 38 is converted into the conductive polymer 14, here polyphenylacetylene which is chemically, here covalently bonded to, the carbon nanotubes 12 as shown and described above in connection with FIG. 2. Thus, heating the carbon nanotubes 12 in the carbon nanotube material 39 by passing current through the carbon nanotube material 39 results in thermal disassociation of the monomer material 38. The monomer material 38 is transported to the carbon nanotube material 39 in gas phase by flow either around or through the CNT material 12. The chemical bonding comprises using disassociation by thermal or photon mediated means. The photon mediated bonding comprises photolysis using UV photons. Here for example the UV source 46 is a xenon arc lamp.

It is noted that the polymerization process used to convert the monomer 38 into the polymer 14 comprises: using ultra-violet (UV) photon energy in combination with heat applied at a predetermined temperature based on controlling the kinetics of the polymerization of the monomer, of about 200° to 400° C.-to the CNT material. The heat is applied only on the CNT material. An intermittent phased flow of the monomer material, UV energy and thermal energy are used for placement of conductive bridges between the junctions of pairs of nanotubes in the CNT material.

It should be noted that: The polymerization process may: Use solid or liquid monomers applied via solution exposure, described below, with subsequent application of energy for chemical reaction; Use photon energy bands such as ultra-violet selected for particular molecular species in combination with elevated temperature CNT substrate; Use of elevated temperature CNT substrate only; Use of intermittent phased flow and energy application for optimal placement of conductive bridges; Use of flow of monomer through the thickness of the CNT material and energy application for more effective placement of conductive bridges through sheet thickness; a location: film or targeted growth at CNT-CNT junctions; Use of naturally occurring resistive hot spots to form conductive bridge sites; "Surgical application of conductive paths"; Nanotube Hot Spot Growth Mechanism; Resistive sites generated by hot spots caused by current from the power supply flowing through resistive regions or junctions in the carbon nanotubes in the nanotube sheet can be used to selectively deposit conductive polymer at such hot spots hereby reducing the resistivity at these hot spots.

It should be noted that the polymerization process may be conducted by impregnating the CNT material with monomer prior to placing the CNT material into the reactor. The afore-mentioned solution exposure may be performed as follows: In one embodiment, the CNT material may conveniently be immersed in liquid monomer such as phenylacetylene; Alternately, the CNT material may be immersed in a solution of a solid monomer dissolved in a suitable solvent, for example ethynylpyrene dissolved in acetone. In the latter embodiment the concentration of the monomer in the solvent may be used to control the loading of monomer into the CNT material. The solvent may be evaporated prior to or after placing the CNT material in the polymerization apparatus.

A number of embodiments of the disclosure have been described. Nevertheless, it will be understood that various modifications may be made without departing from the spirit and scope of the disclosure. For example, the monomer material may be, as noted above, acetylene or phenylacetylene; however, other similar linear or planar conjugated molecules with acetylene terminations may also be used. Further, while the method has been described as increasing electrical conductivity, the process will additionally increase thermal conductivity. Accordingly, other embodiments are within the scope of the following claims.

What is claimed is:

1. A structure comprising:
   a plurality of carbon nanotubes; and
   an electrically or thermally conductive material disposed on at least a portion of the carbon nanotubes, such electrically or thermally conductive material being chemically bonded to such portion of the carbon nanotubes; and
   wherein the nanotubes in such portion of the plurality of nanotubes having the chemically bonded electrically or thermally conductive material are chemically bonded one to another by the electrically or thermally conductive material.

2. The structure recited in claim 1 wherein the electrically or thermally conductive material is covalently bonded to such portion of the carbon nanotubes.

3. The structure recited in claim 2 wherein the electrically or thermally conductive material is a conductive polymer.

4. The structure recited in claim 1 wherein the nanotubes in such portion of the plurality of nanotubes having the chemically bonded electrically or thermally conductive material are covalently bonded one to another by the electrically or thermally conductive material.

5. The structure recited in claim 3 wherein the electrically or thermally conductive material comprises polyacetylene or polyphenylacetylene.

6. The structure recited in claim 5 the polymer is doped.

7. The structure recited in claim 6 wherein the dopant is iodine or bromine.

8. A method comprising:
   providing a nanotube material having a plurality of carbon nanotubes;
   providing a source of conductive monomer;
   transporting the monomer in gas form to the nanotube material; and
   converting the monomer to a conductive polymer; and chemically bonding the conductive polymer to a portion of the carbon nanotubes.

9. The method recited in claim 8 wherein the transporting comprises blended gasses containing a monomer, or passing a gas through a liquid monomer.

10. The method recited in claim 9 the transporting comprises vaporizing the monomer.

11. The method recited in claim 9 wherein the vapor comprises bubbling the gas through the liquid monomer.

12. The method recited in claim 8 wherein the conductive monomer is provided as solid or liquid monomers applied through solution exposure.

13. The method recited in claim 8 wherein the chemical bonding comprises using disassociation by thermal or photon mediated means.

14. The method recited in claim 13 wherein the photon mediated means bonding comprises photolysis using UV photons.

15. The method recited in claim 14 wherein the photolysis comprises using a xenon arc lamp.

16. The method recited in claim 8 comprising heating the nanotube material by passing current through the nanotube material to produce thermal disassociation of the monomer material.

17. The method recited in claim 8 wherein the monomer material is transported to the nanotube material in gas phase by flow either around or through the nanotube material.

18. The method recited in claim 8 comprising, a polymerization process to chemically bond the polymer material to the nanotube material.

19. The method recited in claim 18 wherein the polymerization process comprises: using ultra-violet (UV) photon energy in combination with heat applied at a predetermined temperature, based on controlling the kinetics of the polymerization of the monomer.

20. The method recited in claim 18 wherein the polymerization process of about 200° to 400° C. for deposition of polyphenylacetylene.

21. The method recited in claim 19 wherein the heat is applied only to the CNT material.

22. The method recited in claim 8 wherein an intermittent phased flow of the monomer material, UV energy and thermal energy are used for placement of conductive bridges between pairs of the carbon nanotubes.

23. The method recited in claim 8 wherein a film or targeted growth is located at a junction between pairs of the carbon nanotubes.

24. The method recited in claim 9 wherein resistive sites in the carbon nanotube material are used to selectively deposit a conductive polymer.

25. The structure recited in claim 1 wherein the polymer is disposed between ends of pairs of the carbon nanotubes.

26. A method comprising:
Providing a nanotube material having a plurality of carbon nanotubes;
providing a source of gaseous acetylene or liquid phenyl acetylene;
if a source of liquid phenyl acetylene is provided, vaporizing the liquid phenyl acetylene comprising bubbling nitrogen through the liquid phenyl acetylene;
subjecting at least a portion of the carbon nanotubes to either the gaseous acetylene or the vaporized phenyl acetylene to convert the gaseous acetylene or the vaporized phenyl acetylene using chemical photolysis with an ultraviolet (UV) source to chemically bond the converted acetylene or the converted phenyl acetylene to the portion of the carbon nanotubes.

27. The structure recited in claim 1 wherein the structure is a sheet having therein the plurality of carbon nanotubes.

28. A method comprising:
providing a material having a plurality of carbon nanotubes;
providing a conductive source material comprising acetylene, phenylacetylene, or linear conjugated molecule with acetylene termination;
transporting the conductive source material in gas phase flow either around or through the material having the plurality of carbon nanotubes;
converting the transported conductive source material into a conductive polymer material; and
chemically bonding the conductive polymer material to the carbon nanotubes.

29. The method recited in claim 28 wherein the transporting comprises vaporizing the conductive source material by bubbling nitrogen though the conductive source material.

30. The method recited in claim 28 wherein the chemical bonding comprises chemical photolysis.

31. The method recited in claim 29 wherein the chemical photolysis uses an Xenon Arc Lamp.

32. The method recited in claim 28 including ohmic heating of material having the plurality of carbon nanotubes with a power supply to generate hot spots caused by current from the power supply flowing through resistive regions or junctions in the nanotube material, such hot spots being used to selectively deposit the conductive polymer.

33. A structure comprising:
a nanotube structure having a plurality of carbon nanotubes therein; and
an electrically or thermally conductive material disposed on at least a portion of the carbon nanotubes, such electrically or thermally conductive material being chemically bonded to such portion of the carbon nanotubes; and
wherein the carbon nanotubes in such portion of the plurality of carbon nanotubes, having the chemically bonded electrically or thermally conductive material, are disposed in an overlaying, intertwined relationship, the electrically or thermally conductive carbon nanotubes being chemically bonded and electrically or thermally interconnected one to another by the electrically or thermally conductive material.

34. The structure recited in claim 33 wherein the overlaying, intertwined electrically or thermally interconnected conductive carbon nanotubes form a mesh of such electrically or thermally interconnected conductive carbon nanotubes.

35. The structure recited in claim 33 wherein the electrically or thermally interconnected conductive carbon nanotubes are covalently bonded one to another by the electrically or thermally conductive material.

36. The structure recited in claim 34 wherein the electrically or thermally interconnected conductive carbon nanotubes are covalently bonded one to another by the electrically or thermally conductive material.

37. A structure comprising:
a nanotube structure having a plurality of carbon nanotubes; and
an electrically conductive material disposed on at least a portion of the carbon nanotubes, such electrically conductive material being covalently bonded to such portion of the carbon nanotubes; and
wherein the carbon nanotubes in such portion of the plurality of carbon nanotubes having the covalently bonded electrically conductive material are: disposed in an overlaying, intertwined, relationship; and covalently bonded, and electrically interconnected, one to another by the electrically conductive material.

38. A method comprising:
providing a nanotube structure having a plurality of carbon nanotubes; and
processing the provided nanotube structure to form a conductive carbon nanotube structure comprising a plurality of carbon nanotubes having a chemically bonded conductive material, the carbon nanotubes in the formed conductive carbon nanotube structure being chemically bonded one to another by the conductive material.

39. The method recited in claim 38 wherein the chemical bonding is covalent bonding.

40. The method recited in claim 38 wherein the carbon nanotubes in the formed conductive carbon nanotube structure are in an overlaying, intertwined relationship.

41. The method recited in claim 40 wherein the chemical bonding is covalent bonding.

42. The method recited in claim 38 wherein the carbon nanotubes in the provided structure are disposed in a fixed relationship and wherein the processing processes the provided structure with the carbon nanotubes in the fixed relationship to form the conductive carbon nanotube structure.

43. The method recited in claim 42 wherein the chemical bonding is covalent bonding.

44. The method recited in claim 43 wherein the chemically bonded conductive material is an electrically conductive material.

45. The method recited in claim 44 wherein the chemical bonding is covalent bonding.

46. The method recited in claim 44 wherein the carbon nanotubes in the formed conductive carbon nanotube structure are in an overlaying, intertwined relationship.

47. The method recited in claim 46 wherein the chemical bonding is covalent bonding.

48. The method recited in claim 44 wherein the carbon nanotubes in the provided structure are disposed in a fixed relationship and wherein the processing processes the provided structure with the carbon nanotubes in the fixed relationship to form the conductive carbon nanotube structure.

49. The method recited in claim 48 wherein the chemical bonding is covalent bonding.

50. A structure, comprising:
a nanotube structure having a plurality of carbon nanotubes; and
an electrically conductive polymer disposed directly on and in direct contact with at least a portion of the carbon nanotubes; and
wherein the same electrically conductive polymer disposed directly on and in direct contact with at least a pair of the portion of the carbon nanotubes also provides a direct electrical interconnection between the pair of the nanotubes.

51. The structure recited in claim 50 wherein the conductive polymer is polyacetylene.

52. The structure recited in claim 50 wherein the conductive polymer is polyphenylacetylene.

53. The structure recited in claim 50 wherein said same electrically conductive polymer disposed directly on and in direct contact with at least a pair of the portion of the carbon nanotubes providing the direct electrical interconnection between the pair of the nanotubes provides said direct electrical connection without any intermediate electrically conductive adhesive.

* * * * *